United States Patent
Meziane

(10) Patent No.: US 6,299,923 B1
(45) Date of Patent: Oct. 9, 2001

(54) PROCESS FOR PRODUCING AN ICE CONFECTION

(76) Inventor: Jeannine Meziane, 383 Eldridge Rd., Aurora, OH (US) 44202

(*) Notice: Subject to any disclaimer, the term of this patent is extended or adjusted under 35 U.S.C. 154(b) by 0 days.

(21) Appl. No.: 09/021,741

(22) Filed: Feb. 11, 1998

Related U.S. Application Data

(62) Division of application No. 08/808,114, filed on Feb. 28, 1997.

(51) Int. Cl.$^7$ ............... A23G 9/04; A23G 9/14; A23G 9/28
(52) U.S. Cl. ............... 426/512; 426/515; 426/524; 426/101; 426/104; 426/249
(58) Field of Search ............... 426/101, 249, 426/473, 104, 512, 515, 524

(56) References Cited

U.S. PATENT DOCUMENTS

| | | | |
|---|---|---|---|
| 1,710,369 | 4/1929 | Martin | 426/104 |
| 1,901,394 | 3/1933 | Hassell | 426/101 |
| 1,955,817 | 4/1934 | Marchiony | 426/101 |
| 1,963,938 * | 6/1934 | Cover | 99/16 |
| 2,085,495 | 6/1937 | Fulkerson | 426/101 |
| 2,217,700 | 10/1940 | Musher | 426/101 |
| 2,334,052 * | 11/1943 | Wedin | 107/54 |
| 2,347,083 * | 4/1944 | Connellee et al. | 107/54 |
| 2,570,031 | 10/1951 | Gibson | 426/101 |
| 2,576,842 * | 11/1951 | Lehner | 99/136 |
| 2,646,757 * | 7/1953 | Hackmann | 107/1 |
| 2,651,575 | 9/1953 | Talburt et al. | 426/100 |
| 2,821,478 * | 1/1958 | Forkner | 99/129 |
| 2,821,479 * | 1/1958 | Forkner | 99/129 |
| 2,969,285 * | 1/1961 | Cook | 99/23 |
| 2,970,919 * | 2/1961 | Perry | 99/140 |
| 3,615,645 * | 10/1971 | Forkner | 99/1 |
| 3,671,268 * | 6/1972 | Blake et al. | 99/136 |
| 4,310,559 | 1/1982 | Mita et al. | 426/101 |
| 4,353,927 | 10/1982 | Lovercheck | 426/101 |
| 4,507,326 * | 3/1985 | Tarantino | 426/101 |
| 4,548,054 * | 10/1985 | Levine | 62/342 |
| 4,627,555 * | 12/1986 | Locke | 222/200 |
| 4,643,905 * | 2/1987 | Getman | 426/565 |
| 5,135,767 * | 8/1992 | Daouse | 426/515 |
| 5,256,426 | 10/1993 | Tomioka et al. | 426/101 |
| 5,356,648 * | 10/1994 | Kortschot | 426/249 |
| 5,447,036 | 9/1995 | Heinrich | 426/101 |
| 5,523,103 * | 6/1996 | Loalbo | 426/302 |
| 5,603,965 * | 2/1997 | Daouse | 425/130 |
| 5,660,866 | 8/1997 | Tomioka et al. | 426/100 |
| 5,743,639 * | 4/1998 | Puerner et al. | 366/182.1 |
| 5,879,731 * | 3/1999 | Beckett et al. | 426/101 |

FOREIGN PATENT DOCUMENTS

| | | | |
|---|---|---|---|
| 447733 | 9/1991 | (EP) | 426/91 |
| 2008382 | 6/1979 | (GB) | . |
| 2052254 | 1/1980 | (GB) | . |
| 2263615 | 8/1993 | (GB) | 426/101 |
| 55-096052 | 7/1980 | (JP) | . |
| 62-36151 | 2/1987 | (JP) | 426/104 |
| 64-74949 | 3/1989 | (JP) | 426/101 |
| 2-177867 | 7/1990 | (JP) | 426/104 |
| 2-203752 | 8/1990 | (JP) | . |
| 3-83545 | 4/1991 | (JP) | 426/101 |
| WO 93/14644 | 8/1993 | (WO) | . |

OTHER PUBLICATIONS

Arbuckle, "Ice Cream", pp. 260–263, 1977.*
Arbuckle, "Ice Cream", 3rd ed. p. 254, 1977.*
Palm Beach Post, Monday, Section: Accent Page: ID, Jul. 5, 1993 (Dialog Abstract).
St. Paul Pioneer Press, Section: Express, Page: IF, Apr. 19, 1995 (Dialog Abstract).
Food & Beverage Marketing, p. 46, Mar. 1986 (Dialog Abstract).
New Food Products in Japan, v. 16, n. 3, Mar. 1991 (Dialog Abstract).
International New Product Report (21), p. 18, Oct. 29, 1993 (Dialog Abstract).
Advertising Age 57(54), p. 24, Oct. 20, 1986 (Dialog Abstract).
International New Product Report, p. 13, Jul. 28, 1989 (Dialog Abstract).
Dairy Food, 95(2), p. 32, Feb. 1994 (Dialog Abstract).
Worldwide and Drink Report, 49–50, p. 8, Jul. 31, 1985 (Dialog Abstract).
Product Alert 27(36), p. 5–6, Sep. 7, 1987 (Dialog Abstract).
International New Product Report (9), p. 11, May 4, 1990 (Dialog Abstract).
International New Product Report (19), p. 12, Oct. 4, 1991 (Dialog Abstract).
Frozen Food Age 44(6), p. 33, Jan. 1996 (Dialog Abstract ).
Prepared Foods, 158(6), p. 96–98 and 100, 1989 (Dialog Abstract).

* cited by examiner

*Primary Examiner*—Cynthia L. Nessler

(57) ABSTRACT

An ice confection containing a plurality of inclusions within the ice confection and a process for producing an ice confection containing a plurality of inclusions within the ice confection by automatically distributing the inclusions through a fruit feeder into the ice mix.

15 Claims, No Drawings

PROCESS FOR PRODUCING AN ICE CONFECTION

This is a division of application Ser. No. 08/808,114, filed Feb. 28, 1997.

FIELD OF THE INVENTION

The present invention relates to an ice confection and particularly to an ice confection containing a plurality of inclusions therein.

BACKGROUND OF THE INVENTION

Water ice products are well known and are, in effect frozen, diluted and sweetened fruit juices which usually contain stabilisers such as gelatin or gums. They are very popular and they may come in various colors and flavors. They may be molded in various shapes and are often supported on a stick. One commercially available molded water ice product contains within a single relatively large fruit flavored gum inclusion which is manually deposited in the mold before filling.

In order to be more attractive to consumers, it would be desirable to have a water ice product containing a plurality of gum or other inclusions within, possibly having a different colour or flavour to that of the water ice. We have found that the incorporation of a plurality of smaller gum inclusions may be achieved by automatically distributing the gum inclusions through a fruit feeder into the water ice mix: the method is therefore less labor. intensive than manually depositing a single large gum inclusion into the water ice mix.

SUMMARY OF THE INVENTION

According to the present invention, there is provided an ice confection containing a plurality of inclusions within the ice confection the inclusions have defined and usually identifiable shapes which impart a unique appearance and different taste characteristics to the ice confection.

DETAILED DESCRIPTION OF THE INVENTION

The ice confection may be a bar, e.g. a molded bar and it may, if desired, be supported by a stick. The weight of the bar may be, for instance, from 20 to 100 g and preferably from 40 to 80 g. [2.25 oz=63.8 g]. The ice confection may be, for example, a water ice, a sorbet, or a sherbet. The flavor of the ice confection may be any conventional flavor used for an ice confection, for instance, orange, lemon, lime, grape, cherry, etc. The ice confection may be either a single ice confection with inclusions or it may be a shell and core product with the inclusions within the core. In the latter case, the shell thickness is preferably from about 2 mm to 4 mm and the shell length is preferably from about 20 to 50% of the total length of the ice confection.

The inclusions may be, for instance, gum inclusions, nuts, fruit pieces, candies or chocolate pieces. The number of inclusions within the ice confection may be from 2 to 16 but preferably from 4 to 12. The maximum size of each inclusion is preferably about 1 mL, and is preferably less than 0.65 mL. The especially preferred size of each inclusion is from about 0.2 to 0.5 mL. The inclusion may be of any desired shape, e.g. butterfly, fly, larva shapes, etc. as long as it is present in the ice confection as a discrete and visually identifiable component.

When the inclusion is a gum inclusion, the gum of the gum inclusion is preferably gelatin but it may also be any other suitable gum such as carrageenan, xanthan gum, gum tragacanth or agar. Other ingredients of the gum inclusion may include corn syrup, sugar, citric acid, lactic acid, flavors, colors, mineral oil and carnuba wax, etc. The gum inclusions may be of various colors, e.g. orange, red, green and preferably the color of the gum inclusion is different to the color of the ice confection. The flavor the gum inclusion may be, for instance, cherry, orange, grape or lime.

The present invention also provides a process for producing an ice confection containing a plurality of inclusions within the ice confection which comprises automatically distributing the inclusions through a fruit feeder into the ice mix.

In the preparation of an ice confection containing a plurality of gum inclusions within, the gum inclusions may be chilled through a freezer to a temperature from about $-1°$ C. to $-2°$ C., and preferably from $-1.2°$ C. to $-1.5°$ C. before feeding through a fruit feeder into the ice confection mix in a mould. Preferably, the gum inclusions are chilled to a temperature that is within $+0.3°$ C. to $-0.7°$ C. of the chilled ice mix. The temperature should be such that the gums are enabled to stay suspended in the ice confection. If the temperature is too high, the gums soak and if the temperature is too low, the filling of the mould is ineffective due to the formation of air pockets. The fruit feeder is preferably provided with a feed screw which avoids scratching the gum and also to prevent the gum inclusions sticking together which would cause clogging of the pipes and filling nozzles. After incorporation of the gum inclusions, the ice confection is frozen, e.g. in a freezing tunnel, a blast freezer or by means of liquid nitrogen, and stored, preferably at about $-25°$ C. to $-35°$ C.

EXAMPLE

The following Example further illustrates the present invention.

A water ice mix flavored with a sweet intense orange flavour and colored orange with Color Pantone #150U weighing 60.92 g having a volume of 58.57 ml is fed into a cylindrical mold having a length of 60 mm at a temperature of $-1.3°$ C. Eight gum inclusions each having a volume from 0.2 to 0.4 mL are chilled through a freezer to $-1.3°$ C. and distributed through a fruit freezer by means of a screw into the water ice. The gum inclusions contain gelatin, corn syrup, sugar, citric acid, lactic acid, mineral oil and carnuba wax and each is flavored with either lime, grape or wild cherry flavor and colored with green, purple or red color respectively.

The water ice is provided with a stick and frozen in a freezing tunnel to $-30°$ C. for storage. In addition to having a new and different appearance both before and during consumption, the water ice provided unexpectedly different taste characteristics due to the presence of the inclusions.

What is claimed is:

1. A process for producing an ice confection comprising a frozen ice mix containing a plurality of gum inclusions therein which comprises:

preparing and chilling an ice mix;

chilling gum inclusions to a temperature that is within $+0.3°$ C. to $-0.7°$ C. of the chilled ice mix;

automatically distributing the chilled gum inclusions through a fruit feeder into the ice mix such that the gum inclusions stay suspended in the ice mix and do not soak therein to form a chilled ice confection formulation; and freezing the chilled ice confection formulation within a mold to form a frozen ice confection containing the inclusions distributed therein.

2. The process of claim 1, wherein the inclusions are chilled through a freezer to a temperature of from about −1° C. to −2° C., before feeding said inclusions through the fruit feeder and into the ice mix within a mold.

3. The process of claim 1, wherein the frozen ice confection is stored.

4. The process of claim 1, which further comprises introducing the chilled ice confection formulation into a mold at a temperature which is sufficiently low to retain the inclusions suspended in the ice confection without forming significant amounts of air pockets in the mold.

5. The process of claim 1, which further comprises providing the inclusions as a plurality of discrete, defined and visually identifiable shapes.

6. The process of claim 1, wherein said ice mix is chilled to a temperature of −1.3° C. and the gum inclusions are chilled to a temperature of form about −1.2° C. to about −1.5° C. prior to feeding the chilled gum inclusions through said feeder and into the chilled ice mix.

7. The process of claim 1, wherein the ice mix containing the inclusions is frozen to a temperature of about −25 to −35° C.

8. The process of claim 1, which further comprises distributing between 2 and 16 inclusions having a size of from about 0.2 to 0.5 ml into the ice mix to form the chilled ice confection formulation.

9. The process of claim 8, wherein the number of inclusions is between 4 and 12, the flavor of the inclusion is selected from the group consisting of cherry, orange, grape, lime, and mixtures thereof, the flavor of the ice confection is selected from the group consisting of orange, lemon, lime, grape, cherry, and mixtures thereof and, the color of the gum inclusion is different from the color of the ice confection.

10. The process of claim 8, wherein the number of inclusions is between 4 and 8, the flavor of the inclusions is selected from the group consisting of cherry, orange, grape, lime, and mixtures thereof, the flavor of the ice confection is selected from the group consisting of orange, lemon, lime, grape, cherry, and mixtures thereof, and the color of the gum inclusion is different from the color of the ice confection.

11. A process for producing an ice confection comprising an ice mix containing a plurality of gum inclusions therein, which process comprises:

preparing an ice mix and chilling it to a temperature of −1.3° C.;

chilling a plurality of gum inclusions having discrete, defined and visually identifiable shapes to a temperature of from −1° C. to −2° C.;

feeding said chilled gum inclusions into a fruit feeder;

distributing said chilled gum inclusions from the fruit feeder into the ice mix in a mold to form an ince convection formulation having the gum inclusions suspended in the ice mix without soaking therein while maintaining the temperature of the ice mix to be sufficiently low such that significant amounts of air pockets do not form in the mold; and freezing the chilled ice mix formulation within said mold so as to form a frozen ice confection containing said inclusions therein and having a defined shape.

12. The process of claim 11, which further comprises distributing between 2 and 16 inclusions having a size of from about 0.2 to 0.5 ml into the ice mix to form the ice confection formulation.

13. The process of claim 12, wherein the number of inclusions is between 4 and 12, the flavor of the inclusion is selected from the group consisting of cherry, orange, grape, lime, and mixtures thereof, the flavor of the ice confection is selected from the group consisting of orange, lemon, lime, grape, cherry, and mixtures thereof and, the color of the gum inclusion is different from the color of the ice confection.

14. The process of claim 12, wherein the number of inclusions is between 4 and 8, the flavor of the inclusions is selected from the group consisting of cherry, orange, grape, lime, and mixtures thereof, the flavor of the ice confection is selected from the group consisting of orange, lemon, lime, grape, cherry, and mixtures thereof, and the color of the gum inclusion is different from the color of the ice confection.

15. The process of claim 12, wherein the ice mix containing the inclusions is frozen to a temperature of about −25 to −35° C.

\* \* \* \* \*

UNITED STATES PATENT AND TRADEMARK OFFICE
CERTIFICATE OF CORRECTION

PATENT NO. : 6,299,923 B1
DATED : October 9, 2001
INVENTOR(S) : Meziane

It is certified that error appears in the above-identified patent and that said Letters Patent is hereby corrected as shown below:

Title page,
Before the section "[*] Notice", please insert the following section to identify the Assignee:
-- [73] Assignee: Nestec S.A., Vevey (CH) --

After "*Primary Examiner*—Joseph A. Kaufman", insert:
-- [74] *Attorney, Agent, or Firm*—Winston & Strawn --

Column 4,
Line 8, change "ince" to -- ice --
Line 9, change "convection" to -- confection --

Signed and Sealed this

Eighteenth Day of June, 2002

*Attest:*

*Attesting Officer*

JAMES E. ROGAN
*Director of the United States Patent and Trademark Office*